(12) United States Patent
Bator (10) Patent No.: US 9,555,375 B2
(45) Date of Patent: Jan. 31, 2017

(54) METHOD OF POTTING HOLLOW FIBER MEMBRANES AND APPARATUS FOR FILTERING LIQUID WITH HOLLOW FIBER MEMBRANES

(75) Inventor: Zsolt Bator, Oroszlany (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/588,611

(22) Filed: Aug. 17, 2012

(65) Prior Publication Data
US 2014/0048473 A1 Feb. 20, 2014

(51) Int. Cl.
*B01D 63/02* (2006.01)

(52) U.S. Cl.
CPC .......... *B01D 63/021* (2013.01); *B01D 63/02* (2013.01); *B01D 63/022* (2013.01); *B01D 2313/025* (2013.01); *B01D 2313/10* (2013.01); *B01D 2313/21* (2013.01); *B01D 2323/42* (2013.01)

(58) Field of Classification Search
CPC ..... B01D 63/02; B01D 63/021; B01D 63/022; B01D 2323/42; B01D 63/04; B01D 63/06; B01D 63/061; B01D 69/08; B29C 45/14385; B29C 35/0277; B29C 39/24; B29C 45/14614; B29C 65/54; B29C 65/527
USPC . 210/500.23, 321.8, 321.89, 321.6; 264/537, 138, 261, 263, 277, 311
See application file for complete search history.

(56) References Cited

U.S. PATENT DOCUMENTS

| | | | |
|---|---|---|---|
| 3,832,264 A * | 8/1974 | Barnette | 428/71 |
| 4,689,191 A * | 8/1987 | Beck et al. | 264/573 |
| 5,608,028 A | 3/1997 | Sanftleben et al. | |
| 6,592,759 B2 | 7/2003 | Rabie et al. | |
| 6,685,832 B2 | 2/2004 | Mahendran et al. | |
| 7,393,486 B2 | 7/2008 | Szabo et al. | |
| 7,931,805 B2 | 4/2011 | Schafer et al. | |
| 2002/0153299 A1 | 10/2002 | Mahendran et al. | |
| 2005/0068681 A1 | 3/2005 | Yao et al. | |
| 2005/0126978 A1 | 6/2005 | Cote et al. | |

(Continued)

FOREIGN PATENT DOCUMENTS

| | | |
|---|---|---|
| CN | 102600727 A | 7/2012 |
| EP | 1148932 B1 | 6/2005 |

(Continued)

OTHER PUBLICATIONS

Maddox, J.F. et. al, Non-Uniform Thermal Properties of an Alumina Granule/Epoxy Potting Compound, Thermal and Thermo mechanical Phenomena in Electronic Systems (ITherm), 2010 12th IEEE Intersociety Conference, Jun. 2-5, 2010.

(Continued)

*Primary Examiner* — David C Mellon
*Assistant Examiner* — Pranav Patel (57) ABSTRACT

A method for potting hollow fiber membranes comprises the steps of forming a bundle of membranes with a layer of adhesive; covering one end of the bundle with a permeate pan, the ends of the membranes protruding upwards into the permeate pan; and flowing a liquid potting material into the permeate pan. The bundle may be tilted to more quickly distribute the liquid potting material. An apparatus for filtering liquid with hollow fiber membranes comprises a bundle of membranes, a layer of adhesive spaced from the end of the bundle, a permeate pan covering the end of the bundle, and a header formed with the membranes, the adhesive and the pan.

16 Claims, 6 Drawing Sheets

(56) References Cited

U.S. PATENT DOCUMENTS

| | | | |
|---|---|---|---|
| 2006/0151373 A1* | 7/2006 | Szabo et al. ............. | 210/321.61 |
| 2008/0035270 A1 | 2/2008 | Coan et al. | |
| 2009/0032455 A1 | 2/2009 | Tada et al. | |
| 2009/0159521 A1 | 6/2009 | Luning et al. | |
| 2009/0200695 A1* | 8/2009 | Schafer et al. ............... | 264/145 |
| 2011/0062074 A1 | 3/2011 | Ishibashi et al. | |
| 2011/0139345 A1 | 6/2011 | White et al. | |

FOREIGN PATENT DOCUMENTS

| | | | |
|---|---|---|---|
| EP | 1194019 | B1 | 12/2006 |
| EP | 1174175 | B1 | 2/2008 |
| EP | 1994976 | A1 | 11/2008 |
| EP | 1570897 | B1 | 11/2009 |
| GB | 2016358 | * | 9/1979 |

OTHER PUBLICATIONS

Search Report and Written Opinion from corresponding PCT Application No. PCT/US2013/051020 dated Oct. 7, 2013.
Unofficial English Translation of Chinese Office Action issued in connection with corresponding CN Application No. 201380043816.6 on Nov. 24, 2015.

* cited by examiner

METHOD OF POTTING HOLLOW FIBER MEMBRANES AND APPARATUS FOR FILTERING LIQUID WITH HOLLOW FIBER MEMBRANES

FIELD

The present invention relates to a method of potting hollow fiber membranes and an apparatus for filtering with hollow fiber membranes.

BACKGROUND

In order to filter a fluid with hollow fiber membranes, the membranes are fixed to a header, alternatively called a potting head or a tube sheet, such that their outer surfaces are sealed to a first face of the header, but their lumens are open to a second face of the header. In an immersed membrane module the header, with the membranes, is then attached to a permeate pan to create a permeate collection space between the second face of the header and the pan. The permeate collection space is connected to a source of suction to create a trans-membrane pressure across the walls of the membranes and to carry the liquid from the ends of the membranes through the permeate collection space.

In U.S. application Ser. No. 10/167,699, the ends of membranes are potted in a liquid wax to create a fugitive lamina. The wax is allowed to solidify around the ends of the membranes. A thermosetting or thermoplastic synthetic resinous material is then poured over the wax to create a fixing lamina. The wax prevents the ends of the membranes from being plugged with the resinous material. The resinous material is allowed to harden around the membranes into a header. The wax is then removed by, for example, heating or dissolving with a solvent, leaving the ends of the membranes open to a space formerly occupied by the wax.

In U.S. Pat. No. 6,592,759, ends of membranes are potted in a dense gel. A liquid, less dense than the gel, is poured over the gel and around the membranes. The gel prevents the ends of the membranes from being plugged with the liquid. The liquid is allowed to harden into a header. Once the liquid has hardened, the gel is removed by vibrating to a fluid state, flushing with a solvent, or heating.

In U.S. Pat. No. 7,393,486, a bundle of hollow fiber membranes are potted by injection molding a hot thermoplastic into a cavity containing the membranes. The cavity is formed between a mold and two spaced-apart layers of adhesive pre-applied to the bundle of membranes. The hot thermoplastic is allowed to harden into a header.

In U.S. application Ser. No. 12/381,097, ends of membranes are inserted into a spacer and held with open ends protruding upwards from the spacer. The spacer can be a plate with openings to accommodate the membranes or the spacer can be flexible plastic strips. In the case of flexible plastic strips, the strips can be wound up in spiral shape, or segments of plastic strip can be combined to form a multi-layer package. Once the membranes are inserted in the spacer, a liquid is then poured around the membranes and over the top of the spacer. The spacer is non-permeable to the liquid thus preventing the liquid from flowing down the membranes. The liquid is allowed to harden into a header.

SUMMARY OF THE INVENTION

This specification describes a method of potting hollow fiber membranes, and an apparatus for filtering liquid with hollow fiber membranes.

The method for potting hollow fiber membranes comprises the steps of forming a bundle of membranes with a layer of adhesive, covering the end of the bundle with a permeate pan so that the end of the bundle extends upwards into the pan, and flowing a liquid potting material into the pan to fill the spaces between the membranes and to cover the layer of adhesive.

Through this method, the steps of potting the ends of the membrane in a fugitive lamina, and removing the fugitive lamina once the header has formed, are avoided. This method also avoids the need to rapidly inject hot thermoplastic into the potting area. A thermosetting resin may solidify more slowly than melted thermoplastic and does not need to be hot to be in liquid form. Using the force of gravity, the liquid resin is allowed to spread across the layer of adhesive without covering the ends of the membranes. The permeate pan is bonded to the membranes as the resin cures.

An apparatus for filtering liquid with hollow fiber membranes comprises a bundle of membranes held together by a layer of adhesive material; a permeate pan covering the end of the bundle to create a permeate collection space which is in fluid communication with the ends of the membranes; and a header integrally formed with the membranes, the layer of adhesive, and the permeate pan.

BRIEF DESCRIPTION OF THE DRAWINGS

Examples of embodiments of the invention or inventions will be described below with reference to the following figures.

DETAILED DESCRIPTION

Figure 1:
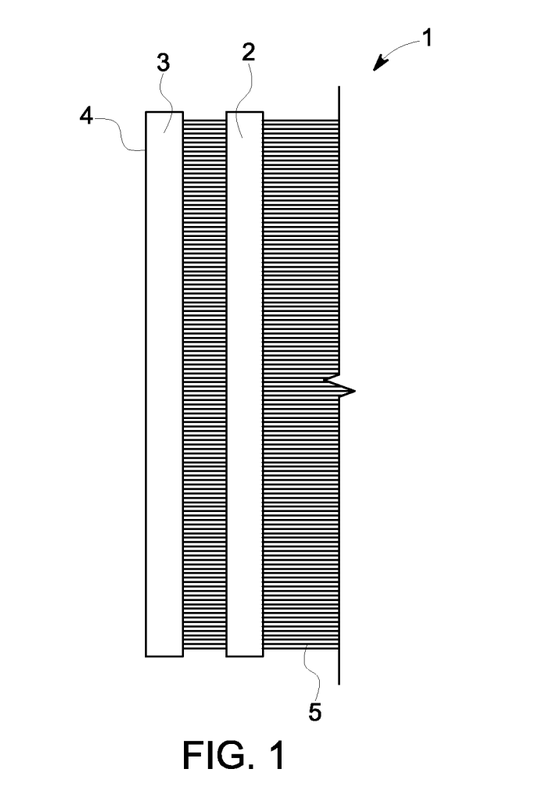
FIG. 1 shows a plan view of two layers of adhesive on a sheet of hollow fiber membranes.

FIG. 1 shows a plan view of a sheet 1 of hollow membrane fibers 5 with two layers of adhesive 2 and 3. Optionally, one layer of adhesive can be used. The sheet of membranes 1 can be formed by laying the membranes 5 on a supporting surface, such as a table, so that the membranes 5 are generally parallel to each other but spaced apart from each other, for example between 0.2 and 2 times their diameter. Optionally, the sheet can be formed by any suitable fabric forming method and have inert fibers running transversely across the membranes to help maintain the membranes in position. Further optionally, the sheet may be formed by winding the membranes onto a drum, preferably though a guide that advances across the face of the drum at a speed relative to the speed of rotation of the drum which lays the fibers in a spiral around the drum at a desired spacing. The membranes may have diameters, for example, between 0.2 and 2.5 mm and there may be, for example, between 10 and 500 membranes in a sheet. The width of the sheet may be, for example, from 200 mm to 1200 mm and the length of the sheet, and its membranes, may be, for example, between 200 mm and 3200 mm. In various Figures, the membranes are shown as cut to a shorter lengths to allow other parts to be shown larger. To form the sheet 1, a first layer of adhesive 2 is placed over the sheet 1 or forming surface so that it is spaced from one end 4 of the sheet 1. Optionally, a second layer of adhesive 3 can be placed over the sheet 1. The second layer of adhesive 3 is at or spaced from the end of the sheet 4. The second layer 3 optionally does not cover or fill the ends of the membranes 5. The second layer 3 may be placed close to the ends of the membranes 5, without closing the ends, to reduce the length of the membranes 5 that will protrude into, and interfere with flows of fluids in, the permeate cavity behind the header. The layers of adhesive 2,3 hold the sheet together. The layers of adhesive 2,3 also seal the entire outer circumference of the membranes 5, although a perfect seal does not need to be formed. The adhesive may be thermoplastic and applied by melting it so that it flows over and around the membranes 5. The adhesive may also be melted after applying it to the membranes 5 and molded or shaped while it is molten to provide a layer of uniform shape or more carefully controlled size. The adhesive may be of a type normally referred to as hot melt glue, which may be a polyethylene or a blend of ethylene vinyl acetate co-polymers. Alternately, the adhesive may be a resin such as polyurethane or epoxy.

Figure 2:
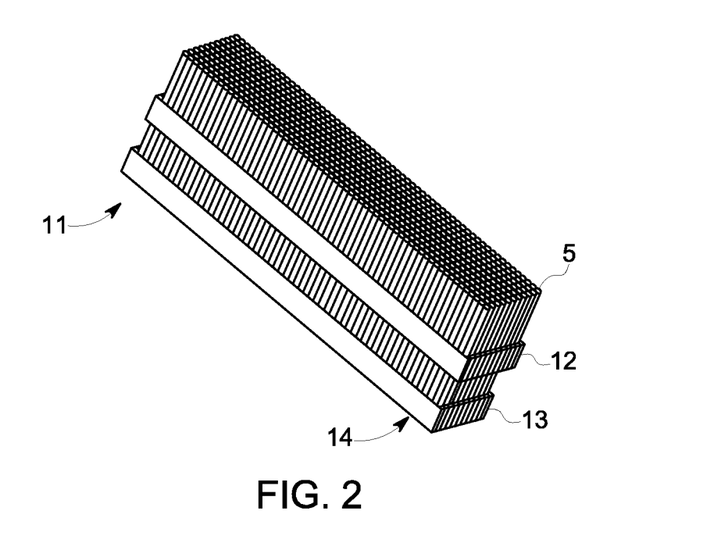
FIG. 2 shows an isometric view of sheets of fibers of FIG. 1 assembled into a larger bundle of fibers having two layers of adhesive.

FIG. 2 shows a bundle 11 of membranes 5 made by stacking a number of sheets 1, for example between 1 and 30 or between 10 and 20 sheets, together. Sheets 1 are stacked so that their adhesive layers 2,3 lay on top of each other to generally form a parallelepiped. Optionally, one or more sheets may be rolled up together to generally form a cylinder or made into other shapes. The sheets 1 may be glued, welded, melted or clamped together or simply held together manually or by wrapping a string, wires, band or other wrap around the bundle. A first layer of adhesive 12 is at, or spaced from, one end 14 of the stack of membranes 5. Optionally, a second layer of adhesive 13 is spaced from and situated between the first layer of adhesive 12 and the end 14 of the membranes 5, optionally so as to leave the ends of the bundle of membranes 5 uncovered by adhesive.

Figure 3A:
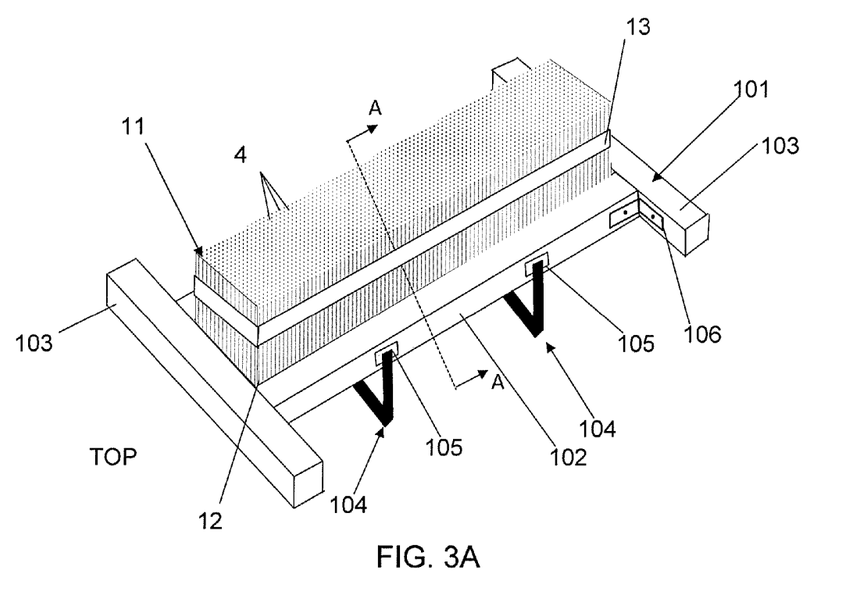
FIG. 3A is an isometric view of a plate clamped circumferentially around a bundle of fibers.
Figure 3B:
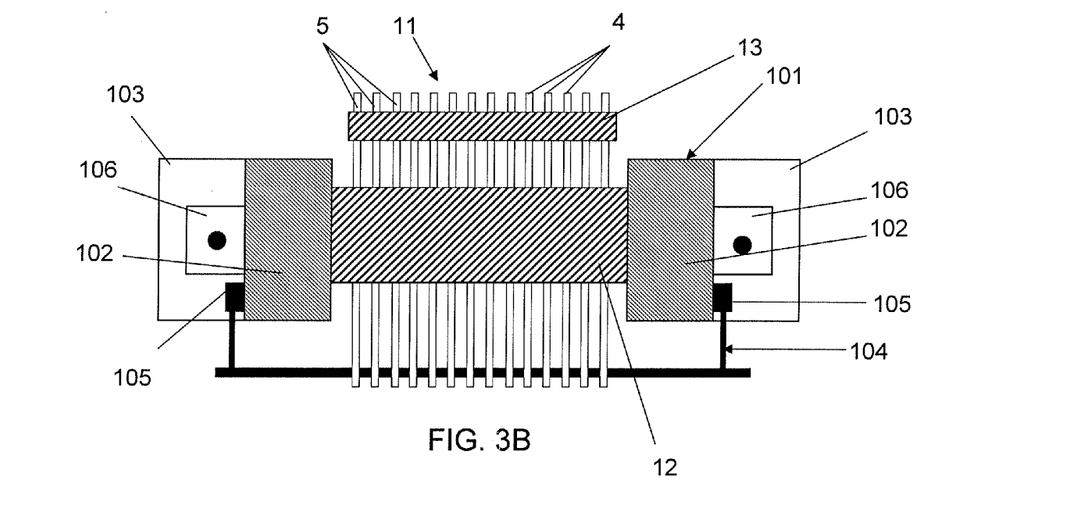
FIG. 3B is a cross-section view of FIG. 3A viewed along the cut line A-A.

FIGS. 3A and 3B shows a bundle 11 of membranes 5 clamped circumferentially by a plate 101 about a first layer of adhesive 12. FIG. 3B is a cross section of FIG. 3A viewed along the cut line A-A. The plate 101 is composed of four metal girder segments: two length girders 102 and two end girders 103. The length girders 102 are clamped lengthwise along opposite sides of the bundle 11 against the first layer of adhesive 12. The length girders 102 are preferably just slightly shorter than the length of the bundle 11. The two length girders 102 are held together by one or more clamps 104 with jaws 105. The jaws 105 are brought together against the two length girders 102 to compress the first layer of adhesive 12. This creates a seal between the first adhesive layers 12 of the sheets 1, as well as a seal between the length girders 102 and the adjacent outermost first layer of adhesive 12 of the bundle 11. Once the bundle 11 is clamped between the two length girders 102, the exposed first layer of adhesive 12 at the sides of the bundle 11 are heated with a heat gun, or a similar heating device to glue the sides of the sheets 1 together. Additional adhesive may be added if necessary. The end girders 103 are preferably slightly longer than the width of the bundle 11. The end girders 103 are then abutted against the first layer of adhesive 12 of the bundle 11, perpendicular to the length girders 102 to create a rectangular plate 101. The end girders 103, like the length girders 102, are sealed against the outermost first layer of adhesive 12 of the bundle 11. Once in position, the end girders 103 can be bolted to the length girders 102 with angle brackets 106 at each of the four intersecting corners where the girders meet. The girders do not need to be bolted together, however. The clamps 104 can be left in place, and additional clamps 104 can be added to hold the end girders 103 against the length girders 102 (not shown). If the bundle 11 is cylindrical in shape (not shown), the plate may be a collar.

Figure 4A:
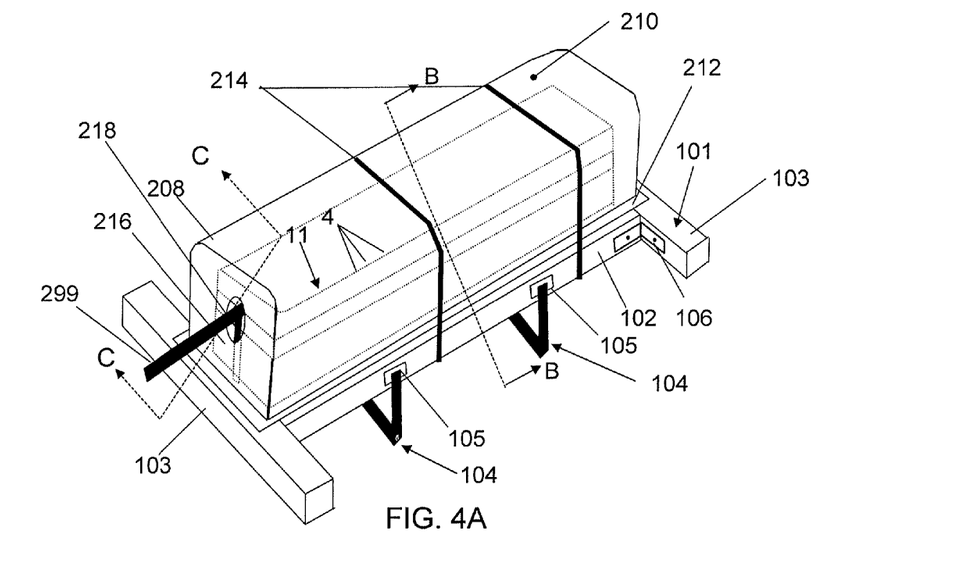
FIG. 4A is an isometric view of a plate and bundle abuted against a permeate pan.
Figure 4B:
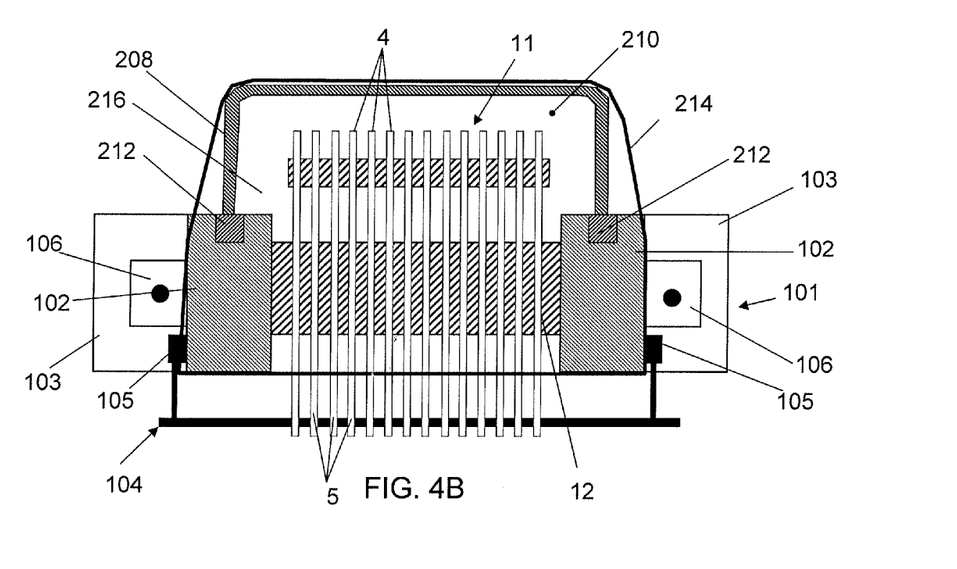
FIG. 4B is a cross-section view of FIG. 4A viewed along the cut line B-B.

FIGS. 4A and 4B are substantially the same as FIGS. 3A and 3B, respectively, the difference being that one end of a bundle 11 is covered with a permeate pan 208 to form a potting region 216. The permeate pan 208 is an inverted bowl. The base of the pan is open to receive the ends of the membranes 5 in a bundle 11. The base of the permeate pan 208 seals against the top of a plate 101. The potting region 216 is defined by a space between the plate 101, a layer of adhesive 12 and the permeate pan 208. FIG. 4B is a cross section of FIG. 4A viewed along the cut line B-B. Upon seating the pan 208 on the plate 101, the pan 208 has a collection space 210 in fluid communication with the ends of the membranes 5. The plate 101 may have rubber inserts 212 to improve the seal between the plate 101 and the base of the permeate pan 208. The permeate pan 208 is pressed into the rubber inserts 212 of the plate 101 and held in place with wires 214 wrapped circumferentially around both the permeate pan 208 and the plate 101. Wires 214 are not required, however: any sort of clamp or vice could apply pressure from the top of the permeate pan 208 and the bottom of the plate 101. A hole 218, such as a spigot hole, may be present in the top of the permeate pan 208. A pipe can be used in flowing a potting liquid into the potting region 216. An end of a-up pipe 299, can be inserted through the hole 218, down through a space between the membranes 5, and into the potting region 216. Optionally, multiple pipes 299 can be inserted through one or more holes 218 into the potting region 216. Pipes 299 could also be inserted up through the bottom of the first layer of adhesive 12 (preferably before clamping) or through a hole made in the side of the permeate pan 208 (not shown). The pipes 299 could extend into the potting region 216 to any depth, but preferably a distance of ⅛th and ⅜ths of the total length of the potting region 216, from both ends of the potting region 216. Once filled with a liquid urethane (as described below) or other resin and left to solidify into a header, the header will be formed integrally with the membranes, the sides of the permeate pan 208, and the top of the layer of adhesive 12. The plate 101 and pipe(s) 299, are to be removed preferably before the resin has completely solidified as they do not form part of the header.

Figure 5:
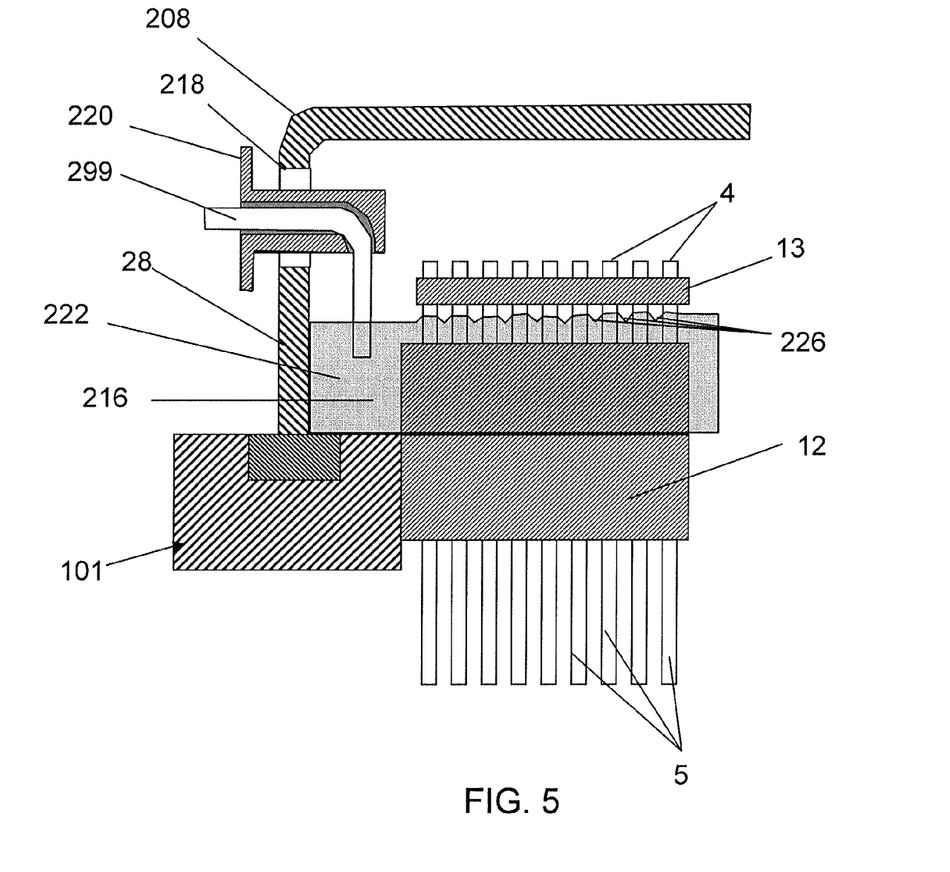
FIG. 5 is a cut-out cross-section view of FIG. 4A viewed along cut line C-C, with a potting region filled with a liquid resin.

FIG. 5 shows a front cross-section view of a potting region 216 and surrounding area substantially as shown in FIGS. 4A, viewed along cut lines C-C, filled with liquid resin 222. The potting region 216 is the space defined by a first layer of adhesive 12, a plate 101, and, a permeate pan 208. A liquid resin 222, is flowed into the potting region 216 through a pipe 299, and around the membranes 5. When a sufficient amount of liquid resin 222 is present to form, when solidified, a header, the flow of liquid resin 222 into the potting region 216 is stopped. The liquid resin 222 does not extend to the very ends of the membranes 5 and does not cover or fill the ends of the membranes 5. As the liquid resin 222 is left to solidify, it forms meniscuses 226 around the membranes. To avoid forming a meniscus, the resin may be filled to the second layer of adhesive 13.

A protector cap 220 is optionally fit into a hole 218 to redirect the pipe 299 downward towards the potting region 216. The protector cap 220 is to help prevent covering or filling the ends of the membranes 5 with a liquid resin 222 when it is being flowed into the potting region 216.

Figure 6A:
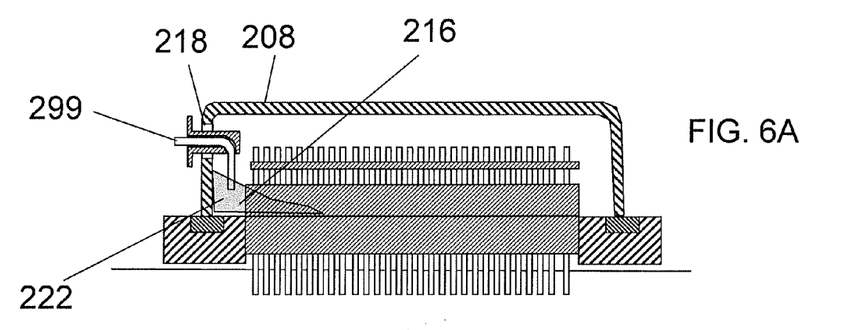
FIGS. 6A,B and C are side views showing the use of gravity to more quickly flow a liquid resin across a potting region.
Figure 6B:
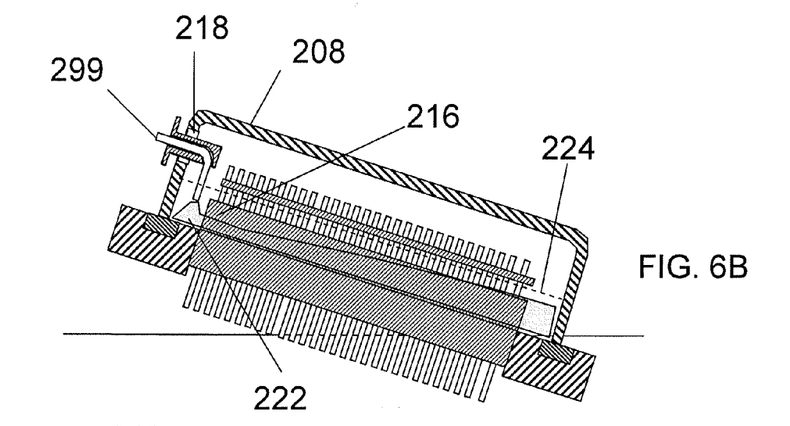
Figure 6C:
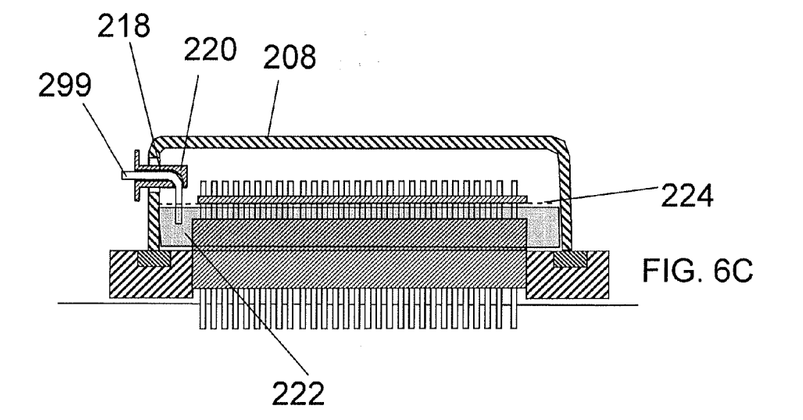

FIGS. 6A, 6B, and 6C show side views of the process of filling a potting region 216 with a liquid resin 222 through a pipe 299. The end of the pipe 299 is inserted through a hole 218 in a permeate pan 208 down into the potting region 216. FIG. 7B shows the tilting of the potting region 216 to flow the liquid resin 222 throughout the potting region 216 more quickly using the force of gravity. The bundle 11 may be tilted in any direction to flow the liquid resin 222 in that direction more quickly. The liquid resin 222 is not allowed to flow over the ends of the membranes 5 or cover or fill the ends of the membranes 5. When the liquid resin 222 has reached a pre-defined level 224, which is below the ends of the membranes 5, the bundle 11 is tilted back to a position to make the liquid resin 222 level. The flow of liquid resin 222 from the pipe 299 is then stopped.

Figure 7:
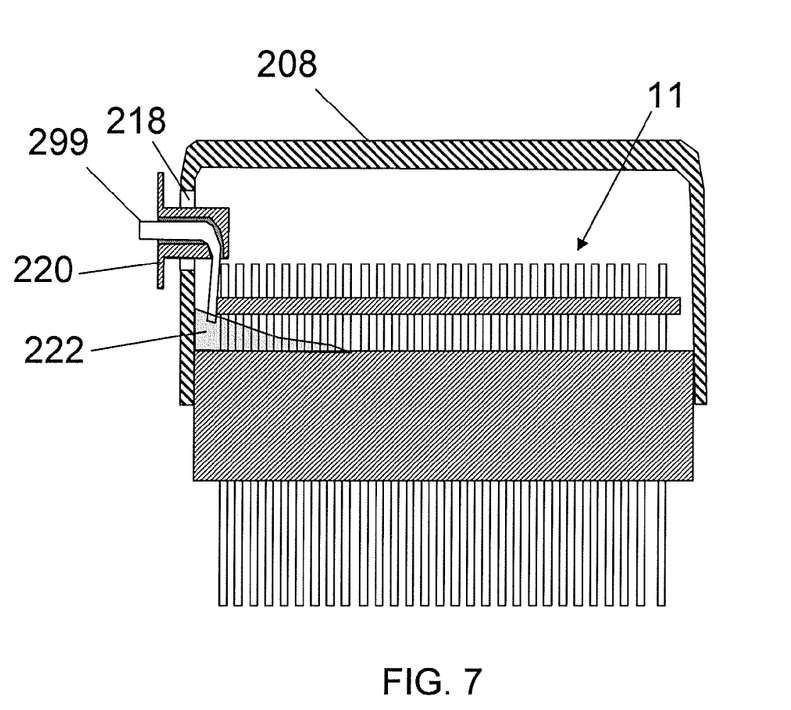
FIG. 7 is a side view of a bundle fitted into a permeate pan.

FIG. 7 shows a side view of the bundle of membranes 11 fitted into the open base of a permeate pan 208. A first layer of adhesive material 12 forms an interference fit with the walls of the pan 208. A perfect seal is not required, however, a good fit around the circumference of the first layer of material 12 will limit the amount of liquid resin that may escape when the liquid resin is flowed into the pan. Liquid resin is flowed into the permeate pan in the same way as described in FIGS. 4 to 6. It may be flowed in through a hole 218 in the pan 208. One or more pipes 299 and one or more protector caps 220 may be used assist with flowing the liquid resin 222 into the pan 208. The liquid resin 222 is left to harden into a header. Once hardened, the header will be integrally formed with the pan 208 and the bundle of membranes 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method of potting hollow fiber membranes, comprising the steps of:
    forming a bundle of hollow fiber membranes with a first layer of adhesive material spaced from an end of the bundle;
    providing a plate around the bundle, the plate extending from and compressing the first layer of adhesive material;
    covering the end of the bundle with a permeate pan to define a permeate collection space between the permeate pan and the first layer of adhesive material, the permeate pan abutting the plate, the end of the bundle within the permeate collection space;
    flowing a liquid potting material into the permeate collection space to form a layer of liquid potting material in contact with the permeate pan and the bundle, the layer of liquid potting material extending from the first layer of adhesive material to a level at or below the end of the bundle; and
    allowing the liquid potting material to harden to bond the permeate pan to the bundle of hollow fiber membranes,
    wherein the bundle of hollow fiber membranes is formed with a second layer of adhesive material between the first layer of adhesive material and the end of the bundle,
    and wherein the liquid potting material is flowed into the permeate collection space to form a layer of potting material that extends only as far as the second layer of adhesive material.

2. The method of claim 1, wherein the liquid potting material is flowed into the permeate collection space to form a layer of potting material that extends to a level below the end of the bundle.

3. The method of claim 1, wherein the liquid potting material is flowed into the permeate collection space through a hole in the permeate pan.

4. The method of claim 3 wherein the hole is the same hole through which permeate is extracted from the permeate pan.

5. The method of claim 3, further comprising inserting one or more pipes through the hole to flow the liquid potting material into the permeate pan.

6. The method of claim 5, further comprising deflecting the liquid potting material away from the end of the bundle to inhibit the liquid potting material from covering the ends of the membranes.

7. The method of claim 1 wherein the liquid potting material is a thermosetting resin.

8. The method of claim 1, wherein during the step of flowing the liquid potting material, the bundle is tilted so as to use the force of gravity to distribute the liquid potting material across the first layer of adhesive material.

9. A method of potting hollow fiber membranes, comprising the steps of
    forming a bundle of hollow fiber membranes with a first layer of adhesive material spaced from an end of the bundle;
    covering the end of the bundle with a permeate pan, the permeate pan contacting the first layer of adhesive material to define a permeate collection space between the permeate pan and the first layer of adhesive material, the end of the bundle within the permeate collection space;
    inserting a pipe into the permeate pan and adjacent to the membranes;
    flowing a liquid potting material through the pipe into the permeate pan to extend a layer of potting material over the first layer of adhesive material and contact the permeate pan and membranes; and,
    allowing the liquid potting material to harden to bond the permeate pan to the bundle of hollow fiber membranes,
    wherein the bundle of hollow fiber membranes is formed with a second layer of adhesive material between the first layer of adhesive material and the end of the bundle,
    and wherein the liquid potting material is flowed into the permeate pan to form a layer of potting material that extends only as far as the second layer of adhesive material.

10. The method of claim 9, wherein the liquid potting material is flowed into the permeate collection space to form a layer of potting material that extends to a level below the end of the bundle.

11. The method of claim 10, further comprising inserting the pipe through a hole in the permeate pan.

12. The method of claim 11 wherein the hole is the same hole through which permeate is extracted from the permeate pan.

13. The method of claim 11, further comprising deflecting the liquid potting material away from the end of the bundle to inhibit the liquid potting material from covering the ends of the membranes.

14. The method of claim 9 wherein during the step of flowing the liquid potting material, the bundle is tilted so as to use the force of gravity to flow the potting material across the permeate pan.

15. The method of claim 9 wherein the liquid potting material is thermosetting resin.

16. The method of claim 9 wherein the potting material is flowed into the permeate collection space of the permeate pan.

\* \* \* \* \*